US006916029B2

(12) United States Patent
Warner

(10) Patent No.: US 6,916,029 B2
(45) Date of Patent: Jul. 12, 2005

(54) INDEPENDENT STEERING DEVICE FOR AN AXLE

(75) Inventor: Joseph G. Warner, Sterling Heights, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 197 days.

(21) Appl. No.: 10/400,084

(22) Filed: Mar. 24, 2003

(65) Prior Publication Data

US 2004/0188968 A1 Sep. 30, 2004

(51) Int. Cl.[7] .................................................. B62D 7/22
(52) U.S. Cl. .................................................. 280/89.11
(58) Field of Search ............................... 280/89.11, 89, 280/89.1, 89.12

(56) References Cited

U.S. PATENT DOCUMENTS 734,202 A * 7/1903 Tromble .................. 280/89.11
929,605 A * 7/1909 Larouette ................. 280/89.11
1,157,628 A * 10/1915 Law ......................... 280/89.12
1,210,490 A * 1/1917 Kittle ...................... 280/89.11
1,305,923 A * 6/1919 Morris .................... 280/89.11

* cited by examiner

*Primary Examiner*—Eric Culbreth
(74) *Attorney, Agent, or Firm*—David L. Kuhn; Luis Miguel Acosta; Thomas W. Saur

(57) ABSTRACT

A trailer axle has steerable wheels that rotate on hub assemblies pivotally mounted to the axle. Connected to the axle is a mechanism for controlling the pivoting of the hub assemblies and thereby limiting the extent to which the steerable wheels turn. The mechanism has a rod disposed along the axle and pivotally connected to the hub assemblies. A bracket on the axle has an aperture through which the rod passes, the aperture permitting the rod's motion both parallel to the axle and transverse to the axle. Flanges on the rod span an opening of the aperture and slidingly engage the bracket. The flanges are translatable on the bracket transversely to the axle but are immobile in a direction parallel to the axle. The mechanism has collars at the ends of the rod and two elongate coil springs encircling the rod. One end of each spring is affixed to the collar and the other end of each spring is affixed to the flange. The springs bias the rod and hub assemblies toward a position where the hub assemblies and wheels are oriented at a desired steering angle. The position of the collars on the rod can be adjusted to vary the bias of the spring. Adjusting the collars' positions also controls the distance between the springs' coils and thereby ultimately controls the degree of steering of the wheels.

7 Claims, 2 Drawing Sheets

INDEPENDENT STEERING DEVICE FOR AN AXLE

GOVERNMENT USE

The invention described here may be made, used and licensed by the or for the U.S. Government for governmental purposes without paying me any royalty.

BACKGROUND

The invention relates to devices which assist the steering of trailers having multiple axles. The US Army uses such trailers to move heavy equipment or combat vehicles such as an Abrams M1 tank. For such trailers, it is desirable to make at least some of the axles "steerable," meaning that the wheels on these axles can turn in order to assist the trailer's changing direction. Complex linkages are typically used to coordinate turning of wheels on the steerable axles. To avoid such linkages, and yet retain a degree of control over the wheel turn on these axles, I have devised a mechanism that operates independently on each steerable axle.

SUMMARY

The mechanism controls the pivot of the hub assemblies and wheels on steerable axles. The mechanism has a tie rod disposed along the axle and pivotally connected to the hub assemblies. A bracket on the axle has an aperture through which the rod passes. The aperture lets the rod move parallel to the axle and transverse to the axle. The rod passes through flanges that span the aperture and slide on the bracket. The flanges translate on the bracket transversely but not parallel to the axle. Coil springs gird the portions of the rod between the bracket and collars near the ends of the rods. The springs are fixed to the collars and the flange. The springs bias the rod and hub assemblies toward a position where the wheels are at a desired steering angle. The collars' position on the rod can be adjusted to vary the bias of the spring. Adjusting the collars' positions also controls the distance between the springs' coils and thus controls the travel of the rod, thereby limiting how far the rod turns the wheels.

DETAILED DESCRIPTION

Figure 1:
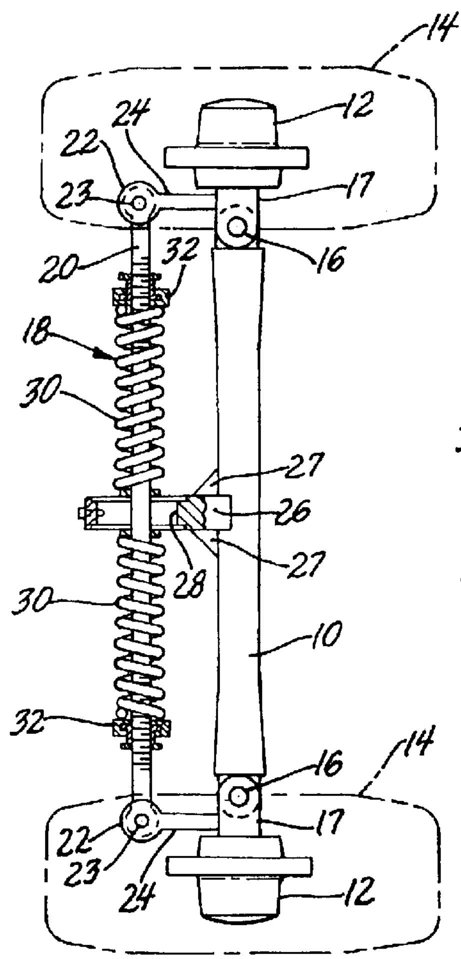
FIG. 1 shows a partially sectioned top view of the independent steering device mounted to the axle of a trailer.

In FIG. 1 is axle 10 having wheel hub assemblies 12 pivotally attached at either end. Assemblies 12 typically are attached to the axle by a king pin 16 passing through respective interleaving hinge elements of the assemblies and axle 12. Upper interleaving hinge elements 17 of assemblies 12 are visible in FIG. 1. In conventional fashion, assemblies 12 have wheel-and-tire assemblies 14 mounted thereon. For convenience, the wheel-and-tire assemblies are shown in a dashed outline.

Disposed along axle 10 is steering device 18 comprised of tie rod 20 having pivot connections 22 at either end. These connections allow relative pivoting between rod 20 and arms 24 about the axis of connector pins 23. Arms 24 are solidly connected to flanges 17 or other parts of assemblies 12. When hub assemblies 12 turn during vehicle steering, rod 20 moves in concert with them. Rod 20 passes through aperture 28 of bracket 26. The bracket is solidly attached to axle 10, and gussets 27 reinforce the connection between it and the axle. Aperture 28 is widened to accommodate the movement of rod 20 toward or away from axle 10 when hub assemblies 12 turn. The rod has two retaining collars 32 disposed near the rod's ends. Rod 20 also has two large springs 30 thereon, and each spring is disposed between bracket 26 and one of the collars.

Figure 2:
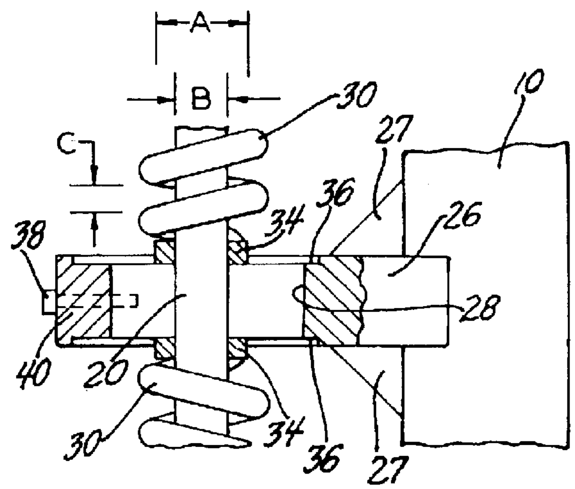
FIG. 2 is a partially sectioned plan detail view of a center bracket and adjoining elements of the independent steering device.
Figure 3:
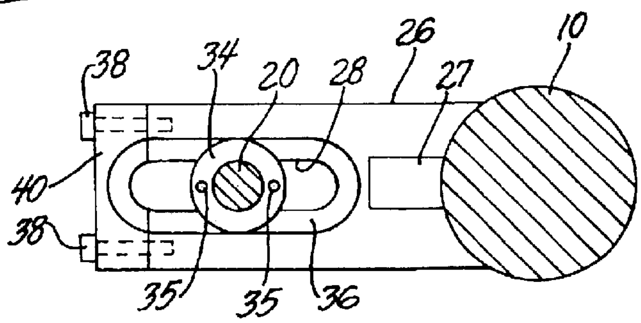
FIG. 3 is essentially a partially sectioned orthogonal projection of FIG. 2, with the spring omitted to more clearly show other elements.
Figure 4:
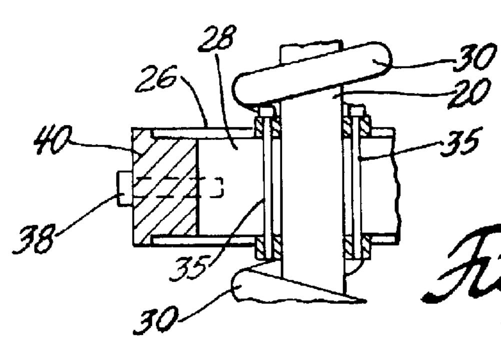
FIG. 4 is a modification of the structure shown in FIG. 2.

Details of bracket 26 and the surrounding structure are best described in conjunction with FIGS. 2 and 3. Two circular flanges 34 span the open ends of aperture 28, and the flanges slide along grooves formed by shoulders 36 of the aperture. As shown in FIGS. 3 and 4, flange bolts 35 can be used to retain the flanges in the grooves, but the compression of springs 30 can also retain the flanges in the grooves. Flanges 34 encircle rod 20 and the rod can slide through them. However, the flanges are affixed to springs 30. By this arrangement rod 20 can axially translate through bracket 26 while springs 30 can not. At the same time, both rod 20 and flanges 34 can move toward axle 10 or away from it. Rod 20 can be released from bracket 26 by extracting bolts 38 and then removing bracket end cap 40 from the rest of the bracket, whereupon rod 20 can be slid out of aperture 28.

Figure 7:
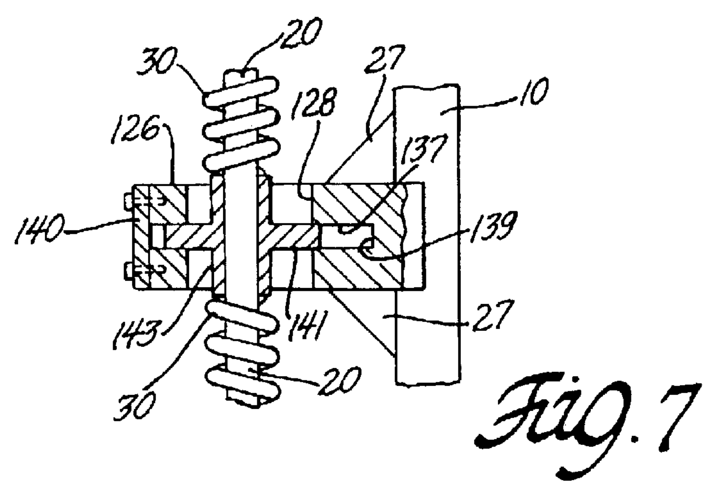
FIG. 7 is a partially sectioned plan detail view of an alternate embodiment of the flange and associated elements shown in FIG. 2.

As an option, bracket 26 can be replaced by a generally similar bracket shown at 126 in FIG. 7. Bracket 126 defines aperture 128, which is similar to aperture 28, and includes end cap 140, which is similar to end cap 40. Bracket 126 differs from bracket 26 by defining a groove 137 extending from end cap 140 to groove end 139 near axle 10. Riding in groove 137 is flange 141 that spans aperture 128. This flange is integral with a sleeve 143 through which translates rod 20. The ends of springs 30 in FIG. 7 are affixed to the respective ends of sleeve 143. The combination of bracket 126, flange 141 and sleeve 143 allows rod 20 to move toward or away from axle, and parallel to the axle. At the same time, this combination prevents the attached ends of springs 30 from moving away from bracket 126 along the axis of rod 20.

Figure 5:
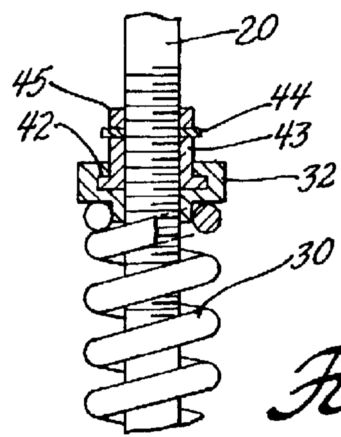
FIG. 5 is a partially sectioned detail view of a spring tension adjuster of the independent steering device.

FIG. 5 shows the engagement of collar 32 with rod 20 and spring 30 in greater detail. Collar 32 is attached to the end of spring 30 and is mounted on rotatable sleeve 42. Sleeve 42 is threaded with rod 20 so that turning the sleeve translates collar 32 along the rod. The exposed exterior circumferential surface 43 of the sleeve has flats or facets such that the sleeve can be turned by a wrench or like tool. Alternatively, collar can be provided with other conventional means for engagement by a hand tool. This can include, for example, spanner wrench holes or gripping teeth. A lock washer 44 or lock nut 45, or both will keep sleeve in a given position along rod 20. Any known means for repositioning sleeve 42 can be used. For example, sleeve 42 need not be threaded with rod 20, but can have a set screw that is tightened with the rod once the collar is in a desired location thereon.

In operation, springs 30 provide a controlled bias that tends to keep hubs 12 and wheel-and-tire assemblies 14 in a position where the vehicle is turned at a desired rate. Normally this position is the straight position as shown in FIG. 1, wherein the vehicle having assemblies 12 and 14 turns neither right nor left. When assemblies 14 turn counterclockwise as seen in FIG. 1, the upper one of springs 30 in that figure will compress and the lower one of springs 30 will stretch. When assemblies 14 turn clockwise, the upper spring stretches and the lower spring contracts. Adjusting the positions of collars 32 compresses or stretches springs 30, thereby controlling the axial distance between spring coils, which is shown as dimension C in FIG. 2. Decreasing or increasing dimension C decreases or increases the angular distance through which assemblies 14 can turn. When springs 30 are totally collapsed, i.e. when dimension C is zero, assemblies 14 can turn no further. Hence, collars 32 can be used to adjust the maximum turn effected by assemblies 14. In like fashion, repositioning collars 32 can control the inner diameter of springs 30, dimension A in FIG. 2. When the springs' inner diameter reaches the rod's outer diameter, dimension B, assemblies 14 can turn no further. Hence, collars 32 can be used to controllingly limit turning of assemblies 14 by adjusting the springs' inner diameter.

Figure 6:
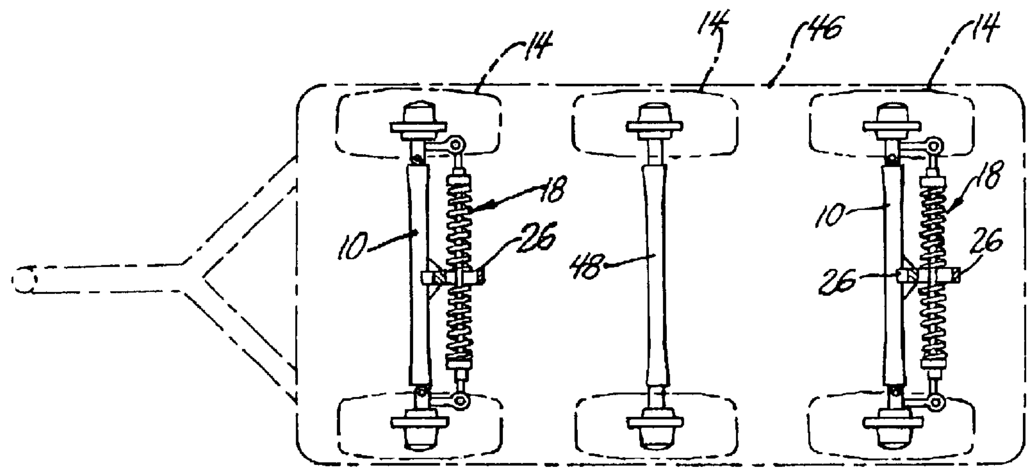
FIG. 6 shows a set of axles on a trailer, in which the fore and aft axles have the independent steering device installed thereon.

In FIG. 6 is shown a multi-axle trailer 46 in dashed outline form. Trailer 46 can have two or more axles but is shown with three. The elements connecting the axles are conventional and are omitted for convenience. Middle axle 48 is a conventional axle that does not allow wheel assemblies 14 thereon to turn. Axle 48 need not be in the middle of trailer 48. It can be located elsewhere and typically is one of the more rearward axles on the trailer. Axle 48 is the often called the pivot axle because trailer 46 turns about a point at the center of this axle. The other two axles are so-called steerable axles 10 wherein wheel assemblies 14 can turn in the same manner as described in relation to FIG. 1 and also have the same steering devices 18 as seen in FIG. 1. Preferably, all axles on trailer 48 except the pivot axle will be similar in structure to axle 10 and will have steering device 18 thereon.

I wish it to be understood that I do not desire to be limited to the exact details of construction or method shown herein since obvious modifications will occur to those skilled in the relevant arts without departing from the spirit and scope of the following claims.

What is claimed is:

1. On an axle having hub assemblies pivotally mounted thereto, a mechanism for controlling the pivoting of the hub assemblies, comprising:

a rod disposed along the axle;

pivot connections between the rod and the hub assemblies;

a bracket on the axle;

an aperture defined by the bracket, the rod passing through and movable in the aperture;

wherein the aperture permits one motion component of the rod toward or away from the axle and permits another motion component of the rod parallel to the axle;

a flange retained on the rod, the flange spanning an opening of the aperture and slidingly engaging the bracket;

wherein the flange is translatable on the bracket transversely to the axle but immobile in a direction parallel to the axle;

a collar at the end of the rod; and a spring disposed along the rod, one end of the spring engaging the collar and another end of the spring engaging the flange;

wherein the spring biases the rod and a hub assembly toward a position where the hub is at a desired steering angle.

2. The mechanism of claim 1 further including means associated with the collar to adjust the bias of the spring.

3. The mechanism of claim 1 wherein the spring is a coil spring, and wherein the mechanism further comprises means for limiting the amount of turn of the hub assemblies, the limiting means comprising means for adjusting an axial location of the collar on the rod, thereby controlling a distance between individual coils of the spring.

4. On a vehicle axle having hub assemblies pivotally mounted thereto and having wheel assemblies mounted on the hub assemblies, a mechanism for controllingly inhibiting the pivoting of the hub assemblies, comprising:

a rod disposed along the axle;

pivot connections between the rod and the hub assemblies;

a bracket extending from the axle and fixed thereto;

an aperture defined by the bracket, the rod being movable through the aperture;

wherein the aperture is wider than the rod thereby permitting motion of the rod toward or away from the axle;

a flange retained on the rod, the flange spanning the aperture and slidingly engaging the bracket and the rod;

wherein the flange is translatable on the bracket transverse to the axle but immobile in a direction parallel to the axle;

a collar at the end of the rod;

a coil spring encircling the rod, one end of the spring affixed to the collar and another end of the spring affixed to the flange;

wherein the spring biases the rod and a hub assembly toward a position at which a desired steering angle is achieved;

means for limiting the amount of turn of the hub assemblies, the limiting means comprising means for adjusting a position of the collar on the rod, thereby controlling a distance between individual coils of the spring.

5. The mechanism of claim 4 wherein the limiting means is also a means to controllingly vary the bias of the spring.

6. The vehicle of claim 5 wherein all axles but a pivot axle is a steerable axle and one steerable axle is a frontmost axle of the vehicle.

7. On a vehicle having a pivot axle and a steerable axle, wherein the steerable axle has hub assemblies pivotally mounted thereto and has wheel assemblies mounted on the hub assemblies, a mechanism on the steerable axle for controllingly inhibiting the pivoting of the hub assemblies, comprising:

a rod disposed along the axle;

pivot connections between the rod and the hub assemblies;

a bracket extending from the axle;

an aperture defined by the bracket, the rod being translatable through the aperture, the aperture being wider than the rod whereby the aperture permits motion of the rod toward or away from the axle;

a flange retained on the rod, the flange slidingly engaged with the bracket such that the flange is translatable transversely to the axle but immobile in a direction parallel to the axle;

a collar at the end of the rod;

a coil spring encircling the rod, one end or the spring affixed to the collar and another end of the spring engaging the flange;

means for limiting the amount of turn of the hub assemblies, the limiting means comprising means for adjusting a position of the collar on the rod, thereby controlling a distance between coils of the spring.

* * * * *